April 26, 1932.  W. H. IRVING  1,855,396
COMBINED VENTILATOR AND SUN SHADE
Filed Sept. 26, 1928
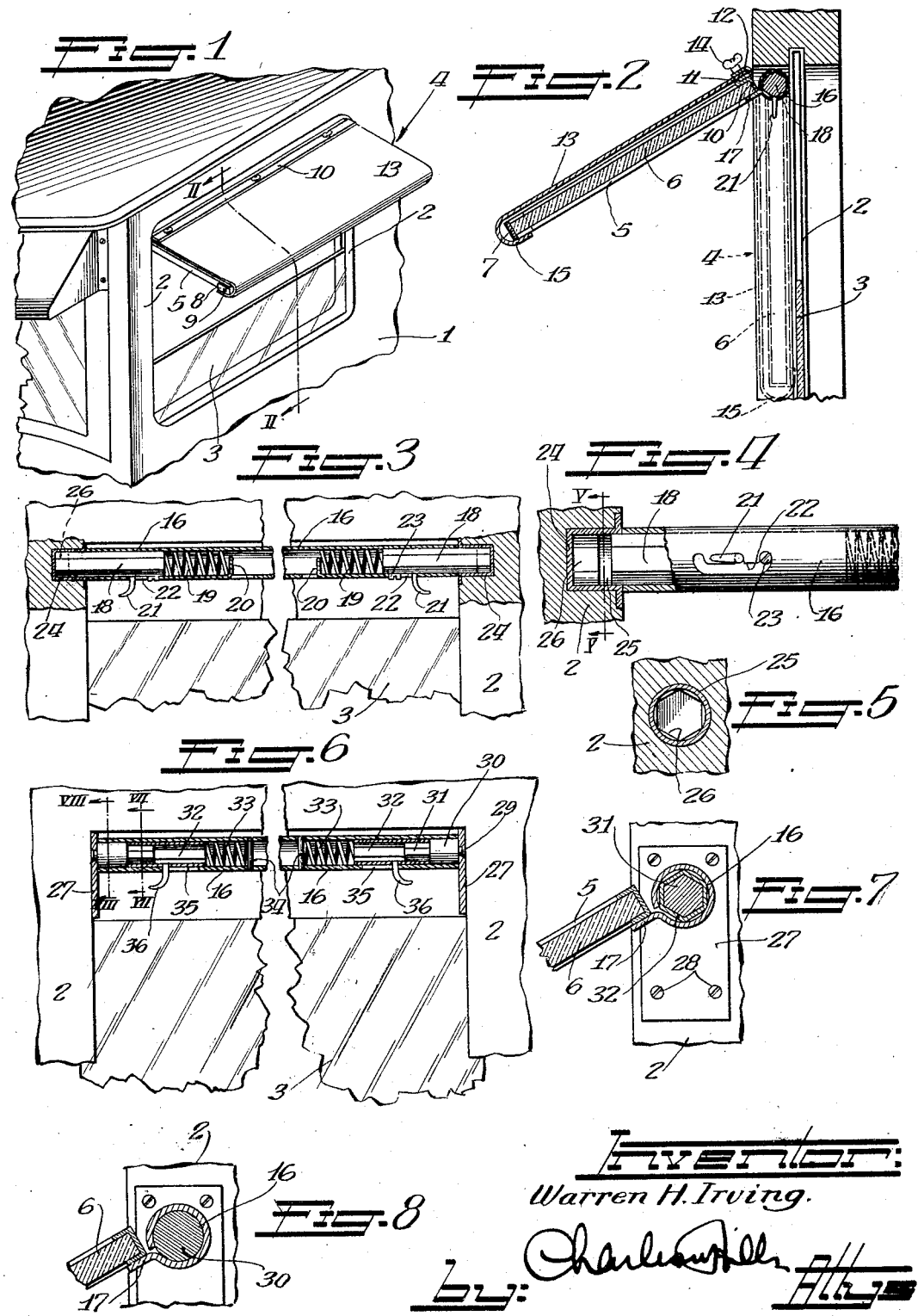
Inventor:
Warren H. Irving.

Patented Apr. 26, 1932

1,855,396

UNITED STATES PATENT OFFICE

WARREN H. IRVING, OF WAUKEGAN, ILLINOIS

COMBINED VENTILATOR AND SUN SHADE

Application filed September 26, 1928. Serial No. 308,353.

This invention relates to improvements in a combined ventilator and sun shade, and more particularly to an angularly adjustable shade especially desirable for use over vehicle windows, although the invention has many and varied other uses as will be apparent to one skilled in the art.

In the past, many and varied devices have been developed to function as ventilators or sun shades for vehicle windows especially for automobiles, but in most instances formerly known devices have proven objectionable in that they were not as readily or easily adjustable as is desired, the intensity of light passing through the sun shade could not be varied, nor were the ventilators or shades as readily removable as has been found desirable. Perhaps one of the greatest objections to these formerly known devices was the fact that the supporting structure for the shade was plainly visible from without the vehicle to which the shade was attached, whereby the external appearance of the vehicle was materially detracted from to such an extent that in most instances purchasers would forego the benefits of such a device to save the external attractiveness of their vehicle.

The present invention has been designed to overcome the above noted defects and objections in the provision of a device of the character described herein which may be originally installed in a vehicle or added as an accessory, the mounting means for the device in both instances being concealed from an observer on the exterior or interior of the vehicle.

The invention also seeks the provision of a sun shade for vehicle windows which may be easily and readily removed entirely from the window and just as easily and readily replaced at any desired angle to the window.

A further object of the present invention is to provide a sun shade for windows or the like in which the color and intensity of the light passing through the shade may be varied at will by the user thereof.

A still further object of the invention is to provide an outwardly extending shade for windows or the like which is readily and easily adjustable to any desired angle relative to the window and which may be folded down into juxtaposed relationship with the window, there being an air passage between the window and the shade so that if the window is partially opened ventilation may be provided for the interior of a closure by air passing underneath the shade.

While some of the more salient features, characteristics and advantages of a device embodying this invention have been above pointed out, others will become apparent from the following disclosures.

The invention includes these and other features of construction and combinations of parts, hereinafter described and shown in a preferred form in the drawings, as more particularly indicated by the claims.

As shown on the drawings:

Figure 1 is a fragmentary perspective view of a vehicle body equipped with a device embodying the principles of the present invention.

Figure 2 is a fragmentary vertical sectional view taken substantially as indicated by the line II—II in Figure 1.

Figure 3 is an enlarged fragmentary vertical sectional view of the upper portion of the device disclosed in Figure 1 showing the mounting means for the device in closed position.

Figure 4 is a fragmentary view of the left hand portion of Figure 3 disclosing the securing means in released position.

Figure 5 is an enlarged fragmentary sectional view taken substantially as indicated by line V—V of Figure 4.

Figure 6 is a fragmentary sectional view similar to Figure 3 showing a modified form of the device.

Figure 7 is an enlarged vertical sectional view taken substantially as indicated by line VII—VII of Figure 6.

Figure 8 is an enlarged vertical sectional view taken substantially as indicated by line VIII—VIII of Figure 6.

As shown on the drawings:

The structure arbitrarily chosen to illustrate an embodiment of the present invention includes a vehicle body 1 having a window frame 2 therein in which the customary glass panel 3 is vertically slidable. A combined sun shade and ventilator, generally indicated by the reference numeral 4, is mounted in the frame 2 above the glass 3. As seen more clearly in Figure 1 no means for supporting the shade 4 are apparent from without or within the body of the car 1.

The shade 4 in this instance comprises a frame including a pair of oppositely disposed channels 5 in which a pane 6, preferably of glass, is slidable. A flat strip 7 having inwardly bent ends 8 thereon removably connected to the side channels 5 by screws 9 or their equivalents, provides such frame member with an end closure which when removed permits the pane 6 to slide from without the channel irons 5. Opposed to the strip 7 is a back member 10 bent upon itself as indicated at 11 to provide a transverse groove 12 to accommodate the upper margin of a substantially transparent or translucent member 13 of any desirable material, preferably of cellulose or celluloid. The member 13, of course, may be tinted or colored as desired. To secure the member 13 in proper position over the pane 6, the strip 10 is provided at its upper face with thumb nuts 14 which may be tightened down to close the groove 12 somewhat so as to grip the member 13 and hold the same in position. At the opposite edge thereof, the member 13 is arced as indicated at 15 so as to embrace the outer end of the shade frame. Obviously, the color and intensity of light passing through the pane 6 to the interior of the vehicle body 1 may be varied as desired by the user of the device by putting on or taking off various members similar to member 13. Of course, if so desired, the pane 6 may be colored also.

Novel mounting and supporting means for the shade 4 have been provided in the present instance, and include a hollow or tubular member 16 running parallel with the rear shade wall 10 and provided with an outwardly extending flange 17 secured to this wall 10 in any desired manner (Figure 2). Within the tube 16 adjacent each end thereof is a polygonal plunger 18 normally urged outwardly by a coiled spring 19, one end of which abuts the inner end of the plunger 18, the other end abutting the stop 20 formed by cutting and bending inwardly a piece of the tube 16. For manual actuation thereof each of polygonal plungers 18 is provided with an outwardly extending tongue 21 projecting through a slot 22 in the tube 16, each of which slots turns inwardly at each end thereof and are also provided with a notched portion adjacent the center thereof as seen more clearly in Figure 4. Each of the polygonal plungers 18 is provided with a screw 23 which also projects through the slot 22 in the tube 16 to limit the inward movement of the plunger.

Embedded in each of the vertical sides of the window frame 2 of the vehicle body 1 is a socket 24 having a smooth inner surface 25 adjacent the outer end thereof and a socket 26 adjacent the inner end thereof, of corresponding polygonal formation to the plunger 18. When the plunger is in its innermost position, the shade 4 is supported and also permitted to rotate to the desired angle; when the plunger is in its outermost position, it is received by the socket 26 of the same polygonal formation and obviously prevented from rotating, thereby supporting the shade at the desired angle.

The operation of the present invention is extremely simple. As seen in Figure 3, the plungers 18 are embedded in the socket portions 26 and so the shade 4 is firmly held to whatever angle it has been adjusted. When in this position, the tongue 24 will be received in the outer turned ends of the slots 22, screws 23 will be received in the central notches of the slots 22. When it is desired to alter the angle of the shade relative to the vehicle window, it is simply necessary to elevate the shade slightly until the tongues 21 and screws 23 are released from the notch portions of the slots 22, when by pulling inwardly on the tongues 21 the plungers 18 may be retracted from the polygonal sockets 26 until the plungers rest in the smooth portions 25 of the sockets 24 when the shade may be rotated to the desired angle. The screws 23 by abutting the termination of the slots 22 prevent the retraction of the plungers 18 entirely from the sockets 24, whereby the shade is effectively supported at all times. After the desired angle has been found, the tongues 21 are released thereby permitting the springs 19 to urge the plungers outwardly again into engagement with the polygonal sockets 26 and the shade will be effectively supported at the new angle. To remove the shade entirely it is simply necessary to remove the screws 23 whereby the polygonal plungers 18 may be inwardly moved beyond the limit of the sockets 24. As shown by the dotted lines in Figure 2 the shade 4 may be folded down to a position within the frame 2 in juxtaposed relationship to the glass panel 3. When in this position, if the glass panel 3 is lowered as shown in Figure 2, there will be an air space between the panel 3 and shade 4 sufficiently to permit air to pass beneath the shade through the air space between the shade and panel and over the top of the panel 3 into the interior of the vehicle body 1.

The previously described embodiment of the present invention is, of course, more or less a built-in job, which is preferably mounted upon the car at the same time the vehicle is assembled. In Figures 6, 7 and 8 I have shown a different form of the present invention which may be readily and easily mounted upon any vehicle after the same has been assembled.

The form of the invention shown in Figures 6, 7 and 8 includes the same window sills 2 and glass panels 3 as in the just previously described embodiment. The shade 4 may also be the same, but is shown in this instance without the member 13 attached thereto. The shade is provided, as in the previous embodiment, with a tubular member 16 secured thereto by an outwardly extending flange 17. In this instance, however, a plate 27 is mounted to each vertical wall of the frame 2 adjacent the top thereof by screws 28 or in any equivalent manner. Attached to each plate 27 as by the rivet 29 is a cylindrical stud 30 provided with an outwardly extending polygonal portion 31. The tube 16 embraces and rests upon the stud 30 and is held at a desired angle to the vehicle window by a pair of oppositely disposed polygonal tubes 32 slidable within the tube 16 and normally urged outwardly by coiled springs 33 over the polygonal portions 31 of the stud 30. In this instance the inner ends of the coiled springs 33 are supported by pins 34 passing through the tube 16. The tube 16 is also provided with a pair of spaced slots 35 to accommodate tongues 36 extending therethrough by which the polygonal tubes 32 are manually operated.

The operation of this form of the invention is equally as simple as in the previously described form. When the polygonal portions 31 of the studs 30 are engaged by the polygonal sleeves 32 as seen in Figure 6, the shade is securely held at whatever angle it may be. When it is desired to change the angle of repose of the shade, the tongues 36 are pushed inwardly withdrawing the sleeves 32 from engagement with the polygonal portions 31 to thereby permit the sleeve 16 to rotate freely upon the studs 30. After the desired angle of repose has been reached, the tongues 36 are released to permit the springs 33 to force the sleeves 32 outwardly over the polygonal portions 31 to securely retain the shade in its new position. To entirely remove the shade it is simply necessary to remove both of the plates 27 by releasing the screws 28.

Although I have shown and described the supporting means for the shade as cooperative polygonal members herein, it is to be clearly understood that where the term polygonal is used herein and in the appended claims, the same is to be construed as meaning any suitable elements having tortuous surfaces or the equivalents thereof.

It should also be especially noted that when the shade is in position upon a vehicle, mounting means therefor are totally concealed from view either from without or within the vehicle, with the single exception of the tongues 21 or 36 which would detract only to a negligible extent from the general appearance of the shade and vehicle.

From the foregoing it will be apparent that I have provided a combined sun shade and ventilator for vehicle windows or any equivalent place which are readily and easily adjustable to any desired angle relative to the window, which are provided with means for varying the color or intensity of light passing therethrough, which are also provided with mounting means effectively concealed from view, which are extremely durable, easy to mount or remove, and which may be economically manufactured.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A motor vehicle sunshade frame comprising a longitudinally extending tubular top member, spring pressed pivot pins longitudinally slidable in said top member and extending therefrom, said pins having a polygonal surface, means arranged to receive said pins and cooperable therewith to support the frame for rotation and to latch the frame in operative position, said means comprising brackets having a recess formed therein, said recess having a smooth portion adapted to permit rotation of said pins when said pins are in a retracted position, and having a polygonal portion adapted to engage said pins against rotation when they are in extended position.

2. A motor vehicle sunshade frame comprising a longitudinally extending tubular top member, members longitudinally slidable in said top member at each end thereof, bracket means arranged to support said frame for rotation thereon when said slidable members are in a retracted position and to latch said slidable members against rotation when they are in extended position, a member extending from said slidable members for manual movement of said members, means arranged normally locking said slidable members against longitudinal movement in said tubular member, said locking means being arranged releasable upon partial rotation of said top member on said slidable members.

3. A motor vehicle sunshade frame comprising a longitudinally extending tubular top member, latching members longitudinally slidable in said tubular member at each end thereof, inwardly struck members on said tubular member, compression spring means positioned engaging said inwardly struck members and said latching members, said latching members having polygonal surfaces, bracket means arranged to support said tubular member for rotation and to engage said latching members to retain the frame against rotation when in a desired operative position, means arranged normally locking said latching members against longitudinal movement, said locking means being arranged releasable upon partial rotation of said tubular member thereon, a stop member on said latching member normally limiting longitudinal movement thereof, said stop member being arranged movable to permit retraction of said latching members whereby said frame may be removed from engagement with said brackets.

4. A motor vehicle sunshade frame having a longitudinally extending tubular top member, supporting brackets for said top member, members longitudinally slidable in the ends of said top member and constrained from rotation with respect thereto, said slidable members normally projecting into said brackets and forming therewith rotative bearings permitting the frame to swing, and said brackets having portions into which said slidable members are extendable and with which said slidable members cooperate to constrain the slidable members against rotation and thus lock the frame against swinging movement.

In testimony whereof I have hereunto subscribed my name at Waukegan, Lake County, Illinois.

WARREN H. IRVING.